US006898572B2

(12) United States Patent
Ohyama (10) Patent No.: US 6,898,572 B2
(45) Date of Patent: May 24, 2005

(54) SYSTEM AND METHOD FOR MANAGING ADVERTISING SPACE (75) Inventor: Yoshio Ohyama, Chigasaki (JP)

(73) Assignees: Hiroto Sugeno, Nerima-ku (JP); Michihiro Tohyama, Meguro-ku (JP); Takashi Sugata, Shizuoka (JP); Toshio Ueki, Maebashi (JP); Toshikazu Suzuki, Yokohama (JP); Takashi Nishihira, Shiroishi (JP); Miyuki Yokoya, Maebashi (JP)

(*) Notice: Subject to any disclaimer, the term of this patent is extended or adjusted under 35 U.S.C. 154(b) by 0 days.

(21) Appl. No.: 10/920,003

(22) Filed: Aug. 17, 2004

(65) Prior Publication Data

US 2005/0021406 A1 Jan. 27, 2005

Related U.S. Application Data (63) Continuation of application No. 09/592,367, filed on Jun. 12, 2000, now abandoned.

(30) Foreign Application Priority Data

Apr. 5, 2000 (JP) ........................................ 2000-103350

(51) Int. Cl.[7] .............................................. G06F 17/60
(52) U.S. Cl. ....................................................... 705/14
(58) Field of Search ............................................ 705/14

(56) References Cited

U.S. PATENT DOCUMENTS 6,141,654 A * 10/2000 Heiden et al. ............... 705/408
2003/0083932 A1 * 5/2003 Wolf et al. .................... 705/14

FOREIGN PATENT DOCUMENTS

JP 411224070 A * 8/1999

OTHER PUBLICATIONS

AdBase: "Boston Media Corporation launches AdBase.net, a one-stop advertising bureau", Business Wire, Mar. 24, 1999.*

* cited by examiner

Primary Examiner—Donald L. Champagne
(74) Attorney, Agent, or Firm—Howson and Howson

(57) ABSTRACT

An intermediary system between advertisers and producers of articles of commerce facilitates the use of the articles or their containers or wrappers to carry advertising matter so that the producers of the articles become advertising space providers. Terminals of numerous advertisers and terminals of advertising space providers are able to connect to a host computer at a management center through a global communications network. Advertisers and advertising space providers enter and store their respective advertising conditions and advertising space information in a database in the host computer, which then provides access enabling the advertisers to search for suitable advertising space and enabling space providers to search for suitable candidates for the use of their advertising space.

5 Claims, 7 Drawing Sheets

Screen of registration and change of environmental support enterprise

| Name of enterprise | Department in charge |
| Postal code | Family name of person in charge |
| Address | First name of person in charge |
| Type of business | Phone number |
| Main article | Fax number |
| Type of business | E-mail |
| Capital / Annual sales | Reg. of environmental media space |
| Other enterprise outline memo | Department in charge |

SYSTEM AND METHOD FOR MANAGING ADVERTISING SPACE

CROSS-REFERENCE TO RELATED APPLICATIONS

This is a continuation of application Ser. No. 09/592,367, filed Jun. 12, 2000, now abandoned.

FIELD OF THE INVENTION

This invention relates to the management of information, and particularly to a novel system and method for the management of information relating to the availability of advertising space and the demand therefor.

The invention has particular utility in the management of advertising space on the surfaces of various articles of commerce, including articles of manufacture, foodstuffs, containers and wrappings. It serves as an intermediary management system, enabling advertisers to locate suitable advertising media, and enabling advertising space providers to locate advertisers whose requirements are satisfied by the advertising spaces being offered.

BACKGROUND OF THE INVENTION

Recently, in the interest of conserving natural resources and preventing environmental pollution, there has been a call for the promotion of recycling and the reduction of waste. The movement toward conservation and environmental protection has found growing acceptance among consumers. Thus, articles such as packaging trays for perishable foods, milk cartons, PET bottles and the like are collected for recycling at various locations, including recycling depositories at supermarkets, etc.

There is, of course, a cost associated with the collection and reuse of these resources, and the cost is an impediment to the promotion of recycling. For instance, a PET bottle cannot be re-used unless its cap has been removed and it has been washed thoroughly. Clear glass bottles need to be separated from colored glass bottles, the latter need to be classified according to color. It is not possible to depend upon consumers' good intentions to accomplish cleaning and classification of recyclable articles, and therefore in practice it is necessary to repeat these operations before the articles are re-used.

Additional costs are incurred in transportation of the articles from collection points to recycling centers. PET bottles and glass bottles are especially bulky and consequently costly to transport. Still further costs are incurred in other operations necessary to return the collected items to usable condition.

In the past, the costs of recycling have been borne for the most part by local governments. If companies trading in the articles being recycled were to be called upon to bear the cost of recycling, the costs of the products to consumers would greatly increase. Moreover, if small and medium-sized companies were required to bear recycling costs, they would be at a serious disadvantage in competing with larger companies.

SUMMARY OF THE INVENTION

The principal object of this invention is to alleviate the problems associated with the costs of recycling. These problems are addressed by a system and method for managing advertising, which promotes the display of advertising on various articles of commerce and thereby generates advertising revenue which can be dedicated to recycling costs.

In accordance with a first aspect of the invention, one or more advertising space providers enter information about available advertising space into a database for storage therein, the database being controlled by a host computer connected to, and accessible for searching of said database through, a global communications network. The database is then searched by plural advertisers from remote locations, through the global communications network.

In accordance with another aspect of the invention, one or more advertising parties enter information about conditions under which they desire to publish advertisements, into a database for storage therein, the database being controlled by a host computer connected to, and accessible for searching of said database through, a global communications network. The database is then searched by plural advertising space providers from remote locations.

The management system of the invention serves as an intermediary between providers of articles who offer advertising space on the articles and potential advertisers. By storing, and providing access to, information on available advertising space, and information concerning the conditions under which potential advertisers wish to place advertising, the invention makes it possible to establish working relationships between parties wishing to launch advertisements and parties willing to provide advertising space. The system adjusts the demands of the advertising space providers and the potential advertisers with a view toward referring the advertisers to suitable advertising space, and referring suitable advertising space providers to the advertisers.

The advertising space provided is not conventional printed matter such as newspapers, magazines, handbills and the like, nor television commercials, but rather the surfaces, or portions of the surfaces, of articles of commerce which have as their principal purpose something other than a visual display of printed or graphic matter. Suitable surfaces can include the surfaces of such diverse items as egg shells, lemon skins, surfaces of toilet paper or tissue paper, paper for rolling cigarettes, cigarette filters. Surfaces of containers and wrapping materials can also be used, for instance, trays, plastic films, beer cans, tissue paper boxes, candy bags, etc. Almost any article of commerce, container or wrapper provides space for carrying advertisements. Moreover, the advertising space moves with the article, and is therefore displayed not only at the point of sale, but, after the sale, wherever the article is found.

The term "articles of commerce" should be understood to include products sold with or without wrappings or containers, and also wrappings and containers for products. To distinguish the advertising space on the surfaces of articles of commerce from conventional advertising space in newspapers, magazines, handbills, posters and other media having as their principal utility the display of graphics or printed matter, the advertising space with which this invention is concerned will be referred to as "environmental media space."

The term "environmental media space provider" means any entity offering environmental media space.

The term "environmental support enterprise" means any entity advertising on, or providing, environmental media space.

In the specification and claims, the terms "provider," "space provider" and "advertising space provider" are used interchangeably to refer to a person or other entity engaged in supplying or providing advertising space, and includes, but is not limited to, an environmental media space provider.

In the specification and claims, the terms "advertiser" and "advertising party" are used to refer to a person or other entity engaged in or seeking to engage in advertising, and includes, but is not limited to advertisers and advertising parties which are environmental support enterprises.

The term "global communications network" should be understood to mean the Internet and any similar network providing substantially worldwide data communications.

The term "select," as used herein with reference to operations carried out at a terminal, refers to the entry of a choice from a group of possible choices, by "pointing and clicking," key entry, touch screen operation or a similar technique.

The term "database" refers to a collection of data structured and organized in a disciplined fashion so that access is possible quickly to information of interest.

By providing an intermediary management system between potential advertisers and providers of articles having environmental media space, the invention promotes the use of environmental media space and fosters the effective use or resources and the reduction of the amount of trash sent to landfills incinerators and other disposal facilities. Enterprises and individuals who advocate the effective use of resources and the reduction of trash are enrolled either as advertisers or as advertising space providers.

Other objects, details and advantages of the invention will be apparent from the following detailed description when read in conjunction with the drawings.

DETAILED DESCRIPTION

Figure 1:
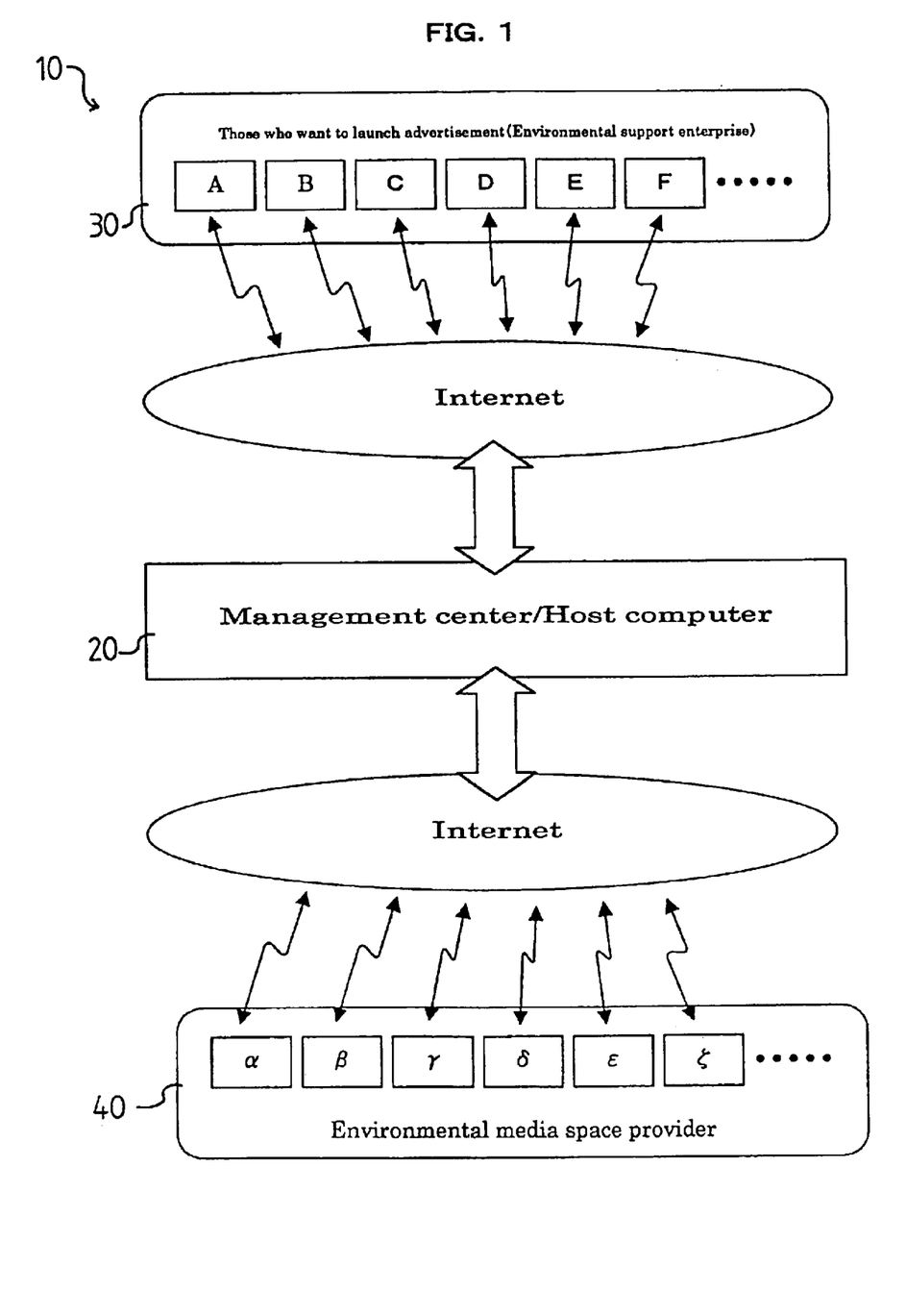
FIG. 1 is a block diagram illustrating the advertising space management system of the invention.

As seen in FIG. 1, in the management/intermediary system 10 in accordance with the invention, the terminals (α, β, γ, δ, ε, ζ, etc.) of environmental space providers 40, and the terminals (A, B, C, D, E, F, etc.) of environmental support enterprises 30 desiring to launch advertisements, are connected to a host computer 20 at a management center through a global communications network, for example, the Internet.

The management/intermediary system 10 may therefore be used by enterprises 30 desiring to launch advertisements, or by environmental space providers 40. The enterprises 30 may utilize the system 10 to search for suitable advertisement space, and the providers 40 may utilize the system 10 to search for acceptable advertisement conditions suited to the spaces which they are able to provide. It is preferable that the host computer be capable of storing information both on available advertising space and on conditions under which potential advertisers wish to launch advertisements, and that it be capable of access for an advertisement space search as well as for an advertisement condition search.

Figure 2:
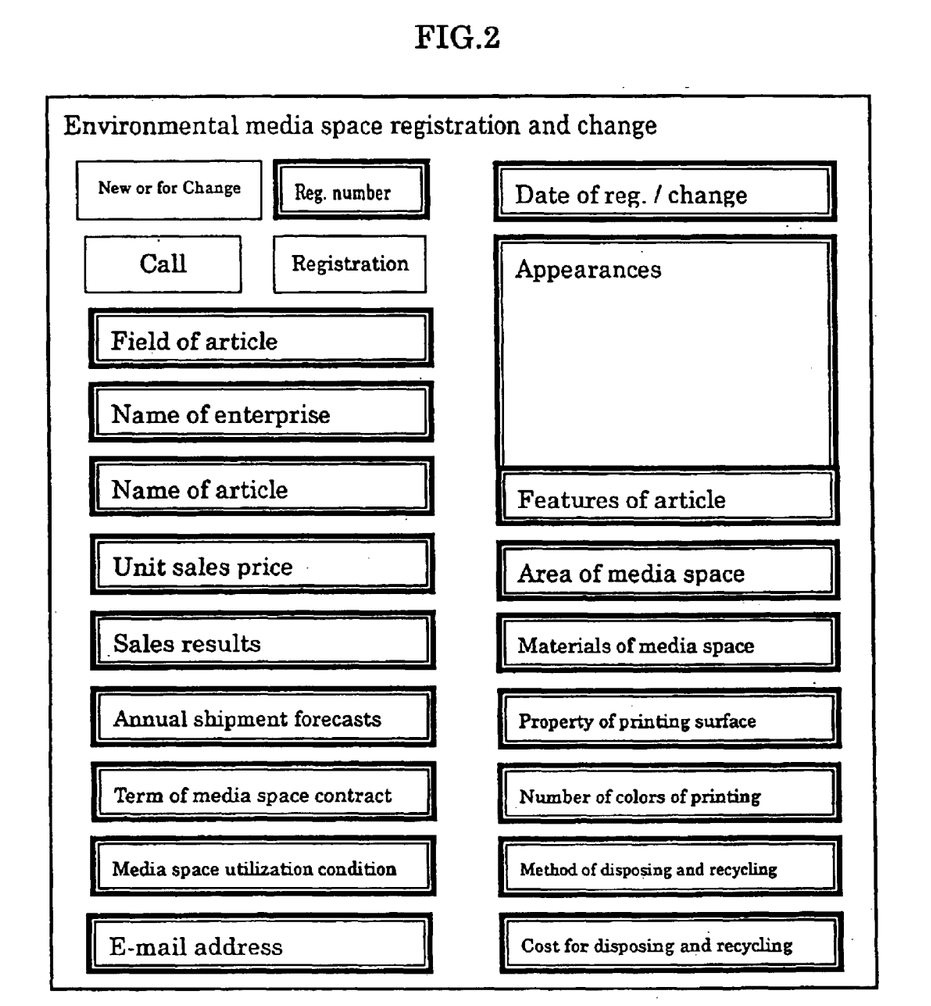
FIG. 2 is a diagram of a computer screen providing a graphical user interface for the registration of available advertising space and for enabling a space provider to change information concerning space previously registered.

Environmental support enterprises desiring advertising space utilize the system in the following manner. It will be assumed that environmental media space information is already stored in the host computer 20 at the management center. Information on the offered environmental media spaces may include the sizes (areas) of the available spaces and other information. This information will have been registered by providers 40 through their terminals, using the screen shown in FIG. 2.

In cases in which the presence of an advertisement will not adversely affect the quality of products, the environmental media space may include a broad variety of surfaces, including the surfaces of foodstuffs such as the skins of fruits (e.g., apples and mandarin oranges) or radishes. The environmental media space may also include wrapping materials such as bags, boxes, cans for canned foods, etc. When environmental media space is registered, it is necessary to enter any limitations on the manner in which the advertising content is to be printed. For example, in addition to the nature of the article on which the space is provided, it may be necessary to enter limitations such as the kinds of inks which may be used in the printing process.

Figure 3:
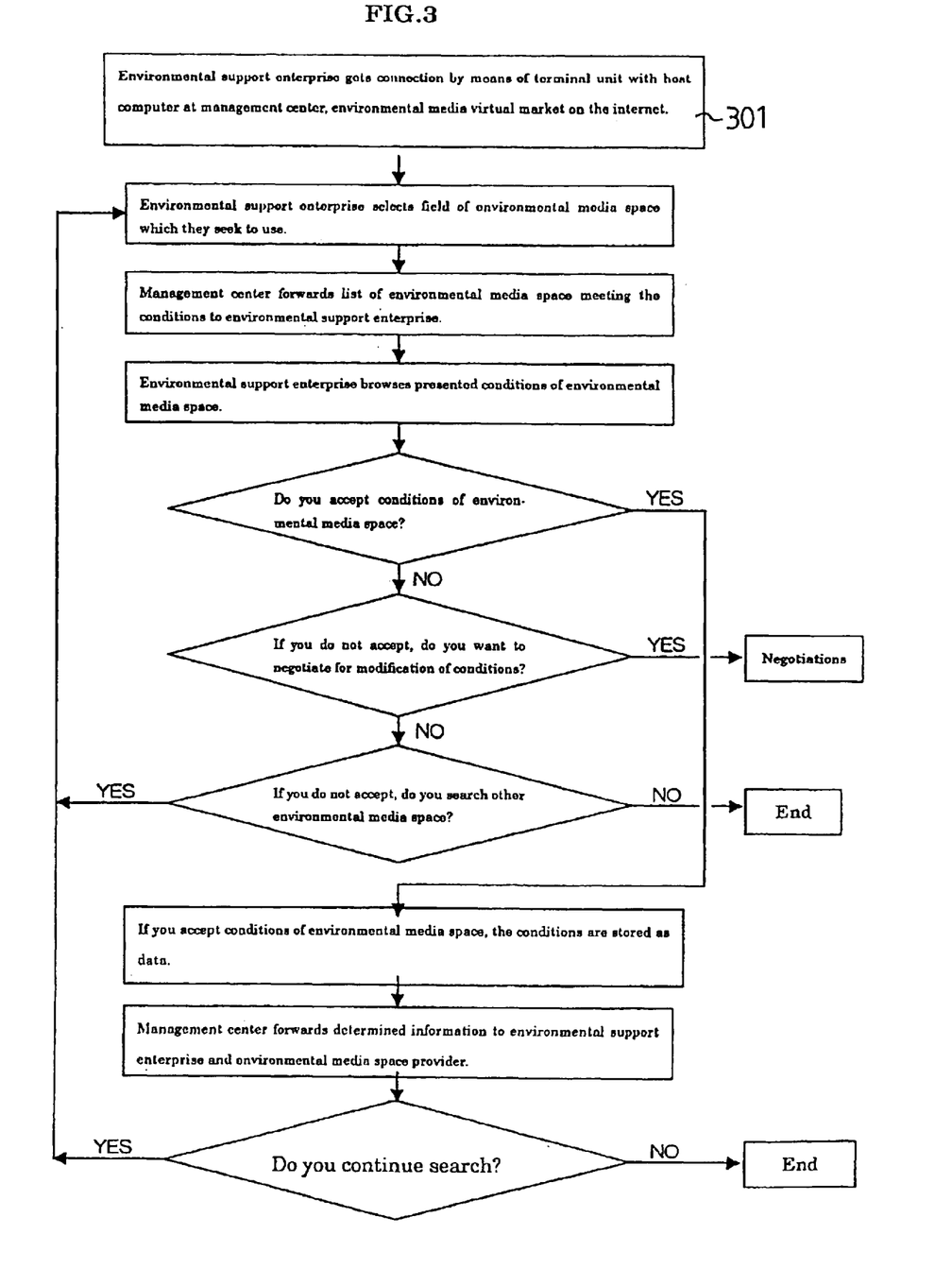
FIG. 3 is a flow diagram illustrating the procedure by which potential advertisers utilize the system.

As illustrated by block 301 in FIG. 3, environmental support enterprises desiring to launch advertisements, gain access to the host computer through the Internet. For security, when connecting to the system, these enterprises must first enter an identification (ID) code and a previously issued password (see block 401 in FIG. 4).

When using the system 10 for the first time, enterprises 30 must select "registration and change of environmental support enterprise" (block 402b in FIG. 4) to register as an environmental support enterprise. Selection of block 402(b) causes a registration screen such as the one shown in FIG. 5 to be displayed. The enterprise may use this same screen later to change registration information, when required.

Figure 5:
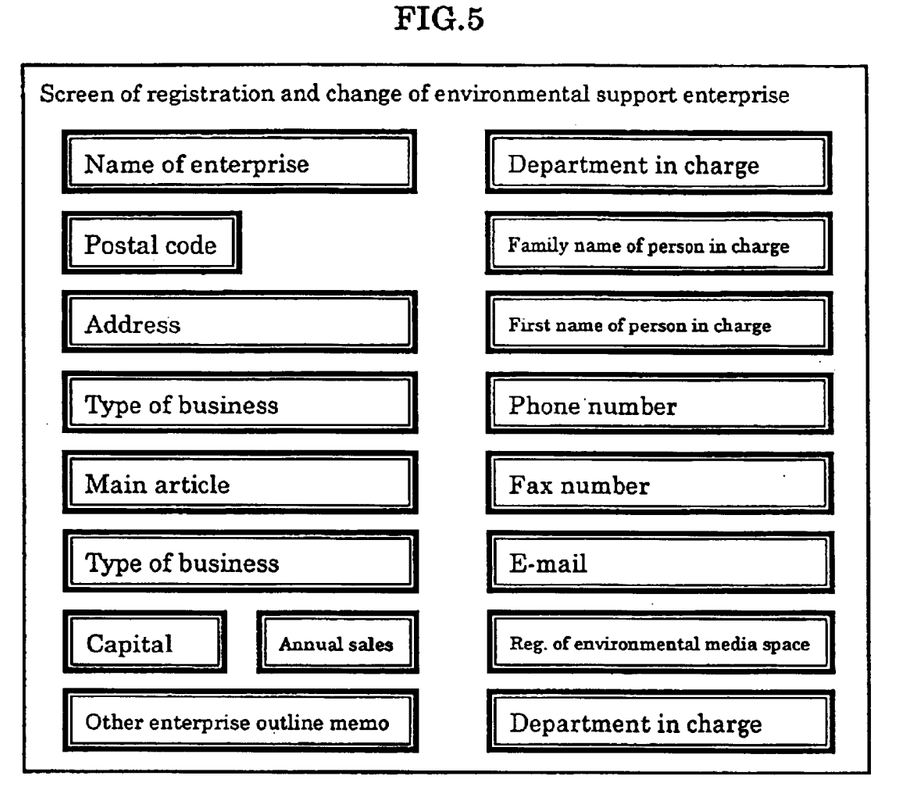
FIG. 5 is a diagram of a computer screen providing a graphical user interface for the registration of an environmental support enterprise and for changing registration information.

The registration screen of FIG. 5 preferably includes a block labeled "Reg. of environmental media space." This block makes it possible for an environmental support enterprise to register as an environmental space provider and as an advertiser at the same time. Selection of the "Reg. of environmental media space" block results in the display of the environmental media space registration screen of FIG. 2.

Changes in the registration information of an environmental support enterprise can be entered at any time by calling up the screen shown in FIG. 5. It is also possible, of course, for users to register, and change registration information off-line. This may be accomplished, for example, by the use of paper registration forms.

Figure 4:
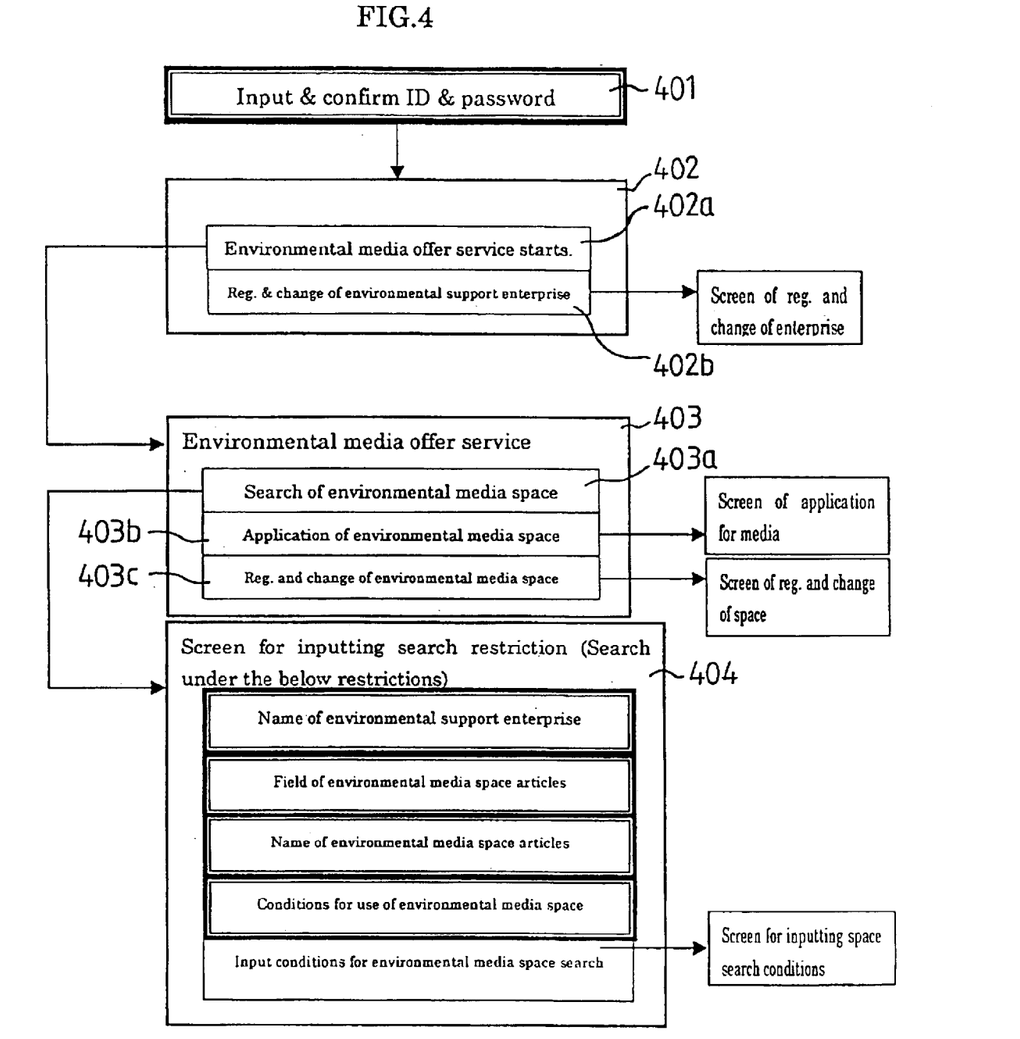
FIG. 4 is a flow diagram illustrating the procedure by which a potential advertiser searches and applies for advertising space.

After registration has been completed, environmental support enterprises who desire advertising space may select, from the display on their terminals, the item "environmental media offer service," corresponding to block 402a in FIG. 4. By selecting this item, the users may search the database for environmental media spaces suitable for the goods or services which they wish to advertise.

A coarse narrowing of the field of search is preferably carried out initially by entering some general conditions as illustrated by block 404 in FIG. 4. By entering general conditions, the user may eliminate unsuitable candidates from among the available environmental media spaces, and thereby carry out a more effective search by entering more detailed conditions.

Figure 6:
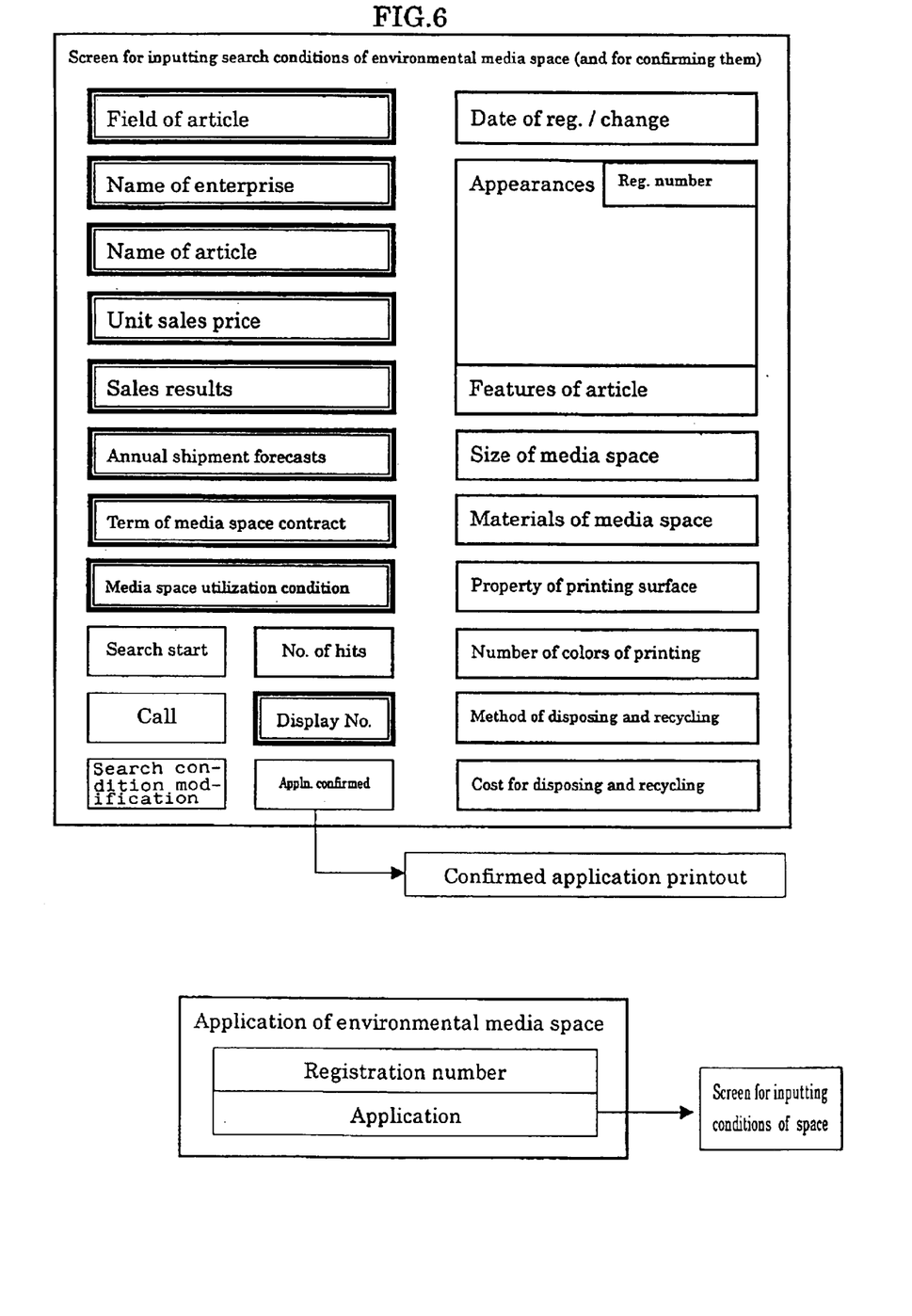
FIG. 6 is a diagram of a computer screen providing a graphical user interface for the entry of search conditions for enabling a potential advertiser to search for suitable environmental media space.

FIG. 6 is an example of a "search condition input" screen for entry of further conditions to narrow the search for suitable environmental media space. When the conditions are set, the search commences and the total number of environmental media spaces meeting the selected conditions will be displayed on the terminal screen as a "number of hits." Registration numbers of the environmental media spaces satisfying the selected conditions may also be obtained.

If the number of hits is too small or too large, the user may operate the "search condition modification," button, enter broader or more detailed conditions, and reexecute the search.

To display information concerning a particular environmental media space from among the "hits," the user operates the "display number" button on the screen of FIG. 6, selects a particular registration number and presses the "call" button to effect display of details concerning the particular environmental media space associated with that registration number.

If the registration number is already known, it can be entered by means of numeric keys on a keyboard without making a search, and the corresponding information may be displayed by operating the "call" button.

When a suitable environmental media space has been located using the system, the environmental support enterprise may apply for its use by selecting or entering the corresponding registration number using the "display number" button, and then selecting "application confirmed." (See the "application confirmed" button in FIG. 6 and step 403b in FIG. 4). The application of the party requiring advertisement space is then sent to the management center over the Internet.

It is also possible to arrange for display of the words "application completed" or similar words on the screen of the party seeking advertising space to acknowledge that the application has been transmitted, and a printout of the contents of the application may also be provided.

Thus, in summary, environmental support enterprises wishing to launch advertisements may search from among the information on available environmental media spaces stored in the management host computer 20 to obtain a suitable space for the intended advertisement. They may also apply for the use of the desired advertising space by means of the Internet.

A reverse search for advertisement conditions can be made by environmental media space providers, using the management/intermediary system 10 in the following manner.

It will be assumed that advertisement conditions are already stored in the host computer 20 at the management center before searching is initiated by an environmental media space provider. The data available for searching in this mode may be deliberately entered by advertisers for the purpose of enabling searching by space providers, along with data accumulated from advertising conditions entered previously by advertisers in the course of their searches for suitable advertising space. Data concerning advertising conditions which have already been satisfied through an application for advertising space may be deleted or flagged.

Figure 7:
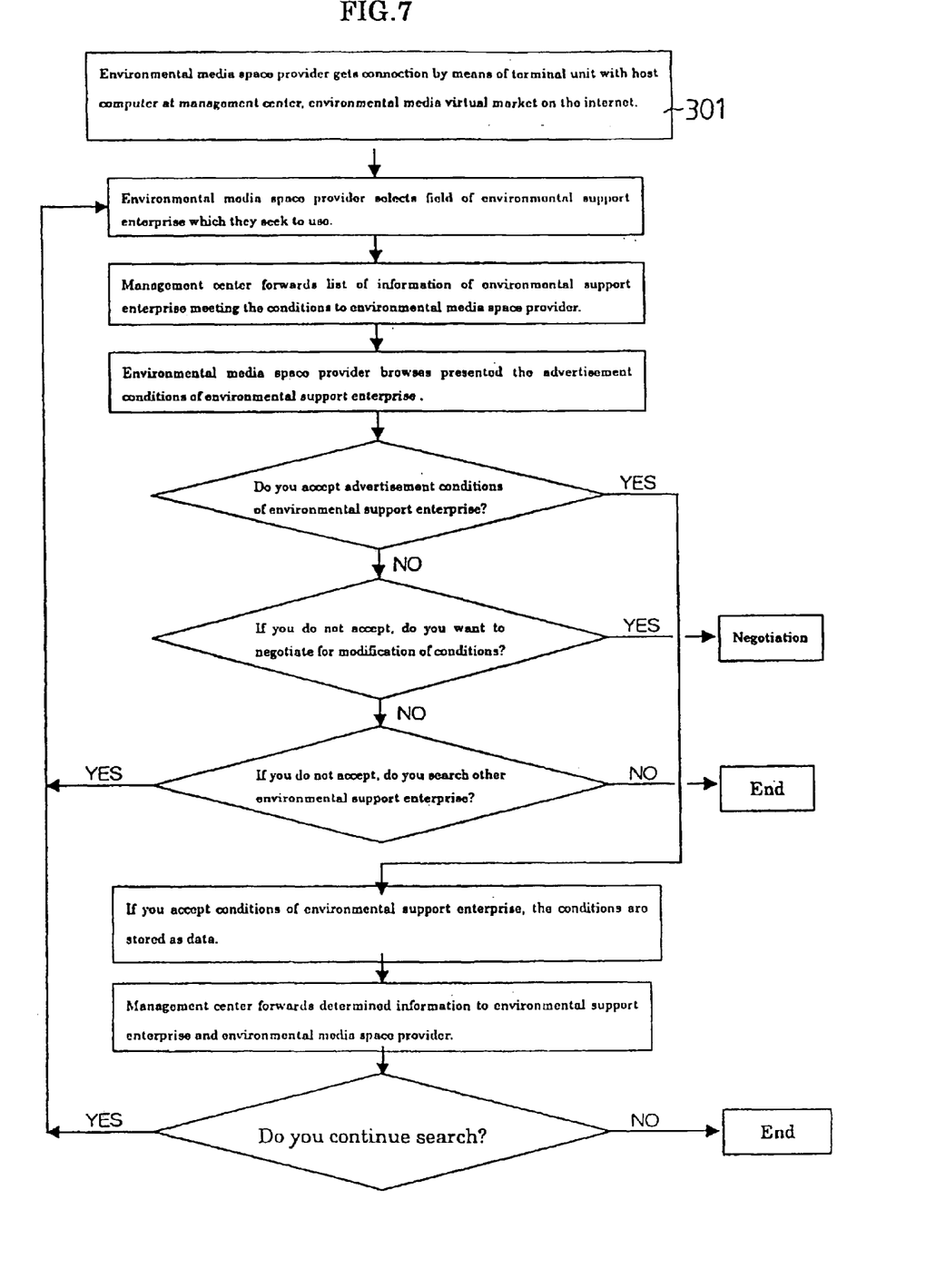
FIG. 7 is a flow diagram illustrating the procedure by which providers of advertising space utilize the system.

Block 701 in the flow chart of FIG. 7 illustrates that an advertising space provider establishes a connection from a remote terminal, through the Internet, to host computer 20 at the management center. Here, as in the case in which an advertiser logs onto the system, an identification (ID) and a previously issued password must be entered in order for the advertising space provider to be able to gain access to data through the host computer.

When a space provider uses the system for the first time, it must select "environmental support enterprise registration and change," whereupon a screen such as that depicted in FIG. 5 is displayed. The space provider must then register as an environmental support enterprise. This may be accomplished on-line or alternatively it may be accomplished on paper.

After registration is completed, the space provider may then search advertisement conditions suitable for the environmental media space which it is offering.

As will be apparent from the similarity of FIGS. 3 and 7, the search procedure carried out by environmental space providers is similar to that carried out by advertisers, and need not be described in detail.

The space provider may search from among the advertising conditions stored in the management host computer, and upon locating a suitable set of conditions for the offered environmental media space, may apply to provide advertising for the party which established those conditions. The application may be made on-line directly through the management/intermediary system 10.

The invention substantially reduces the need for new advertising media by promoting the effective use of existing resources, and thereby reduces waste.

With the management/intermediary system it is also possible to allocate at least a part of the advertising revenue to the cost of disposal of waste and recycling. For example, article manufacturers who offer environmental media space can allocate all or a portion of their advertising fees to the cost of recycling their own products.

Almost all articles of commerce can provide spaces for advertisement either on surfaces of the articles themselves or on the surfaces of their wrappers or containers.

It is possible to select advertising space on goods which are entirely different from the goods which are to be advertised, and the effect of the advertisements can be significantly enhanced. An advertisement can be made especially effective by placing it on a product known, through consumer studies for example, to be purchased regularly by persons likely to be interested in the advertised product. For instance, if a maker of potato chips selects a beer can as a space for advertisement, it is possible to persuade the purchaser of beer to buy a specific brand of potato chips, and the potato chip maker can thus expect its advertising to be highly effective.

Because the management/intermediary system of the invention makes use of the Internet, persons who wish to launch advertisements and persons who provide space for advertisement are able to register and accumulate their advertising conditions and available advertising space respectively, even if they are located remotely from one another, and they can also easily search for suitable advertising spaces and compatible advertising conditions. As a result, it is possible to launch effective advertisements for articles which were previously difficult to advertise, such as articles having different brand names depending on their production sites, e.g., perishable foodstuffs, articles having private brands, regionally limited goods, and so on.

In summary, the invention provides a solution to a unique problem. Whereas an advertising agency can readily locate suitable conventional print advertising space, i.e. newspapers, magazines, signs, handbills, etc. for its clients. However, arranging connections between advertisers and providers of environmental media space has heretofore been much more difficult. According to the invention, those who want to advertise and those who provide environmental media space are able to search for advertising space and advertisement conditions respectively by using the Internet, and are able to make their respective requirements and capabilities known to one another efficiently. Moreover, advertisement revenue or portions thereof can be dedicated to the processing of waste and to recycling to promote the realization of a recycling oriented society. Finally, because almost all existing articles of commerce can provide spaces for advertisement without requiring new materials, as in the case of conventional advertising media, more effective use of resources and the reduction of waste can be realized.

The system and method can be realized using any of a broad variety conventional database and Internet communications programs appropriately configured to carry out the process described above.

Various modifications can be made to the system and method described. For example, just as advertising conditions may be accumulated in the database from search criteria entered by advertisers, information on advertising space can be accumulated from information entered by advertisers in the course of their searches for advertising conditions. Here again advertising space that has already been applied for may be deleted or flagged.

Still other modifications may be made to the apparatus and method described above without departing from the scope of the invention as defined in the following claims.

I claim:

1. A method for the management of advertising space comprising:

advertising, by plural advertising space providers, by providing advertising space on surfaces of articles having utility other than solely the display of printed matter, or on the surface of wrappings for such articles, and by displaying advertisements on at least some of said surfaces;

entry, by plural advertising space providers, of information about available advertising space on said surfaces, into a database for storage therein, the database being controlled by a host computer connected to, and accessible for searching of said database through, a global communications network;

entry, by plural advertising parties, of information about conditions under which each advertising party desires to publish advertisements, into said database for storage therein;

searching of the database by plural advertisers, wherein each advertiser searching the database transmits a search query through the global communication network to the host computer from a location remote from the host computer, and the host computer transmits a response, identifying available advertising space responsive to the search query, through said network; and searching of the database by plural advertising space providers, wherein each advertising space provider searching the database transmits a search query through the global communication network to the host computer from a location remote from the host computer location, and the host computer transmits a response identifying advertisers responsive to the search query through said network.

2. A method for the management of advertising space according to claim 1, wherein at least one of said plural advertising space providers, after searching the database by transmitting a search query, applies to provide advertising space for an advertiser identified in response to the search query transmitted by said at least one advertising space provider, by transmitting an application to the host computer through the global communication network.

3. A method for the management of advertising space according to claim 1, wherein at least one of said plural advertising space providers, after searching the database by transmitting a search query, applies to provide advertising space for an advertiser identified in response to the search query transmitted by said at least one advertising space provider, by transmitting an application to the host computer through the global communication network, and wherein at least one of said plural advertisers, after searching the database by transmitting a search query, applies to use an advertising space identified in response to the search query transmitted by said at least one advertiser, by transmitting an application to the host computer through the global communication network.

4. A method for the management of advertising space according to claim 1, in which said available advertising space is on the surfaces of articles of commerce and also on the surfaces of containers or wrappers for articles of commerce.

5. A method for the management of advertising space according to claim 1, in which at least one of said plural advertisers, in searching the database, transmits plural queries through the global communication network to the host computer from a location remote from the host computer, said queries being of different scope, and in which the host computer transmits, through said network, responses to each of said plural queries, said responses identifying different sets of available advertising spaces.

* * * * *